US008214131B2

(12) United States Patent
Kloos et al.

(10) Patent No.: US 8,214,131 B2
(45) Date of Patent: Jul. 3, 2012

(54) METHOD FOR CONTROLLING AN INTERNAL COMBUSTION ENGINE

(75) Inventors: Albert Kloos, Friedrichshafen (DE); Andreas Kunz, Friedrichshafen (DE); Günther Schmidt, Friedrichshafen (DE); Ralf Speetzen, Friedrichshafen (DE); Michael Willmann, Bermatingen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 1345 days.

(21) Appl. No.: 11/880,935

(22) Filed: Jul. 25, 2007

(65) Prior Publication Data

US 2008/0027624 A1 Jan. 31, 2008

(30) Foreign Application Priority Data

Jul. 26, 2006 (DE) ........................ 10 2006 034 514

(51) Int. Cl.
*B60T 7/12* (2006.01)

(52) U.S. Cl. ......................... 701/104; 123/434; 123/435

(58) Field of Classification Search .......... 701/101–106, 701/114, 115; 123/434, 488, 357, 436, 435
See application file for complete search history.

(56) References Cited

U.S. PATENT DOCUMENTS

| | | | | |
|---|---|---|---|---|
| 4,426,981 | A | 1/1984 | Greiner et al. | |
| RE33,270 | E * | 7/1990 | Beck et al. | 123/447 |
| 5,678,521 | A * | 10/1997 | Thompson et al. | 123/447 |
| 6,088,647 | A | 7/2000 | Hemberger et al. | |
| 6,776,140 | B2 * | 8/2004 | Maier et al. | 123/456 |
| 7,150,275 | B2 * | 12/2006 | Baldauf et al. | 123/681 |
| 7,185,635 | B2 * | 3/2007 | Frank et al. | 123/456 |
| 7,603,984 | B2 * | 10/2009 | Ganser | 123/456 |
| 7,779,816 | B2 * | 8/2010 | Dolker | 123/456 |
| 2003/0121501 | A1 | 7/2003 | Barnes et al. | |
| 2005/0203694 | A1 * | 9/2005 | Baldauf et al. | 701/103 |
| 2006/0157035 | A1 | 7/2006 | Speetzen et al. | |
| 2006/0266332 | A1 | 11/2006 | Kloos et al. | |
| 2008/0296413 | A1 * | 12/2008 | Ganser | 239/533.4 |

FOREIGN PATENT DOCUMENTS

| | | |
|---|---|---|
| DE | 31 18 425 | 12/1982 |
| DE | 195 16 923 | 11/1996 |
| DE | 197 26 756 | 1/1999 |
| DE | 197 40 608 | 3/1999 |
| DE | 198 50 221 | 5/2000 |
| DE | 103 02 806 | 8/2004 |
| DE | 103 44 181 | 4/2005 |
| DE | 10 2004 006 8 96 | 9/2005 |
| GB | 2326672 | 12/1998 |

* cited by examiner

*Primary Examiner* — John Kwon
(74) *Attorney, Agent, or Firm* — Lucas & Mercanti, LLP; Klaus P. Stoffel

(57) ABSTRACT

A method for controlling an internal combustion engine with a common-rail system, in which a fuel quantity is computed from a measured fuel pressure distribution and in which the computed fuel quantity is set as the controlling value for controlling an injection. The fuel quantity is computed by measuring the pressure distribution (pE) of an individual accumulator, reproducing a modeled pressure distribution (pEMOD) according to the measured pressure distribution (pE) using a hydraulic model, and computing the fuel quantity from the hydraulic model.

5 Claims, 2 Drawing Sheets

METHOD FOR CONTROLLING AN INTERNAL COMBUSTION ENGINE

BACKGROUND OF THE INVENTION

The invention concerns a method for controlling an internal combustion engine with a common-rail system.

In an internal combustion engine, the quality of combustion and the composition of the exhaust gas are critically determined by the start of injection, the quantity of fuel injected, and the end of injection. In order to stay within legally prescribed limits, the start and end of injection are usually automatically controlled by an electronic control unit. Between the energization of the injector, the needle stroke of the injector, and the actual start of injection, there is a time delay, so that the actual injection start differs from the set injection start. This causes unequal cylinder-specific operating values and exhaust gas values of the internal combustion engine for one and the same operating point. The same applies to the end of injection. Another source of uncertainty is that, in actual practice, the quantity of fuel is not measured directly but rather is computed from other measured quantities.

DE 197 26 756 A1 discloses a method for controlling an internal combustion engine with a common-rail system, in which the rail pressure is detected as a directly measured quantity, and the fuel quantity is computed by a mathematical function, for example a linear or root function, or by an input-output map. According to the information provided in the cited source, the method is supposed to be real-time-capable in that the fuel quantity is directly determined from the current rail pressure. However, the injection rate and the pump delivery rate of the high-pressure pump, for example, are superimposed in a system-specific way on the rail pressure signal, so that the fuel quantity computed in real time contains errors, or the rail pressure must first be filtered, as described in DE 31 18 425 A1.

The method described in DE 197 26 756 A1 is intended for a conventional common-rail system. The method cannot be used directly in a common-rail system with individual accumulators. The common-rail system with individual accumulators differs from a conventional common-rail system in that the fuel to be injected is taken from the individual accumulator. The feed line from the rail to the individual accumulator is designed in such a way in practice that feedback of interfering frequencies into the rail is damped. During the injection interruption, just enough fuel continues to flow from the rail that the individual accumulator is filled again at the beginning of the injection. The hydraulic resistance of the individual accumulator and that of the feed line are coordinated with each other, i.e., the connecting line from the rail to the individual accumulator has a hydraulic resistance that is as high as possible. In a conventional common-rail system without individual accumulators, the hydraulic resistance between the rail and the injector should be as low as possible in order to realize unhindered injection.

DE 195 16 923 A1 also describes a method for controlling an internal combustion engine, in which the pressure level is measured in a line that connects the injection pump and the injection nozzle. The fuel quantity is computed by normalizing the pressure distribution curve and forming the surface integral, with the actual fuel quantity being computed with the use of a constant of proportionality. The method described in the cited document cannot be used in a common-rail system with individual accumulators due to the structural differences. For example, an injection nozzle driven by an injection pump is a passive element, whereas the injector in a common-rail system can be actively driven.

SUMMARY OF THE INVENTION

The object of the present invention is to provide a control method for a common-rail system with individual accumulators in which the quantity of fuel is also taken into consideration.

In accordance with the invention, the fuel quantity is computed by measuring the pressure distribution of an individual accumulator, reproducing a modeled pressure distribution according to the measured pressure distribution by means of a hydraulic model, and then computing the fuel quantity from the hydraulic model.

To produce a fuel computation that is as exact as possible, the invention provides that a deviation from the measured pressure distribution of the individual accumulator to the modeled pressure distribution is computed, and the model parameters are adjusted until the deviation is smaller than a limiting value. In this connection, the deviation is determined from the quantities that characterize the injection. These are the injection start, the injection end, a pressure difference from the pressure level at the start of the injection to the pressure level at the end of the injection, and an injection angle range or alternatively an injection time.

Since the hydraulic model represents a redundant system for the set point assignment of an injection, this can be reverted to in case of error. The unfiltered individual accumulator pressure is used for the computation, and this makes the system robust. Naturally, this also makes more exact injector evaluation possible.

Other features and advantages of the present invention will become apparent from the following description of the invention that refers to the accompanying drawings.

DETAILED DESCRIPTION OF THE INVENTION

Figure 1:
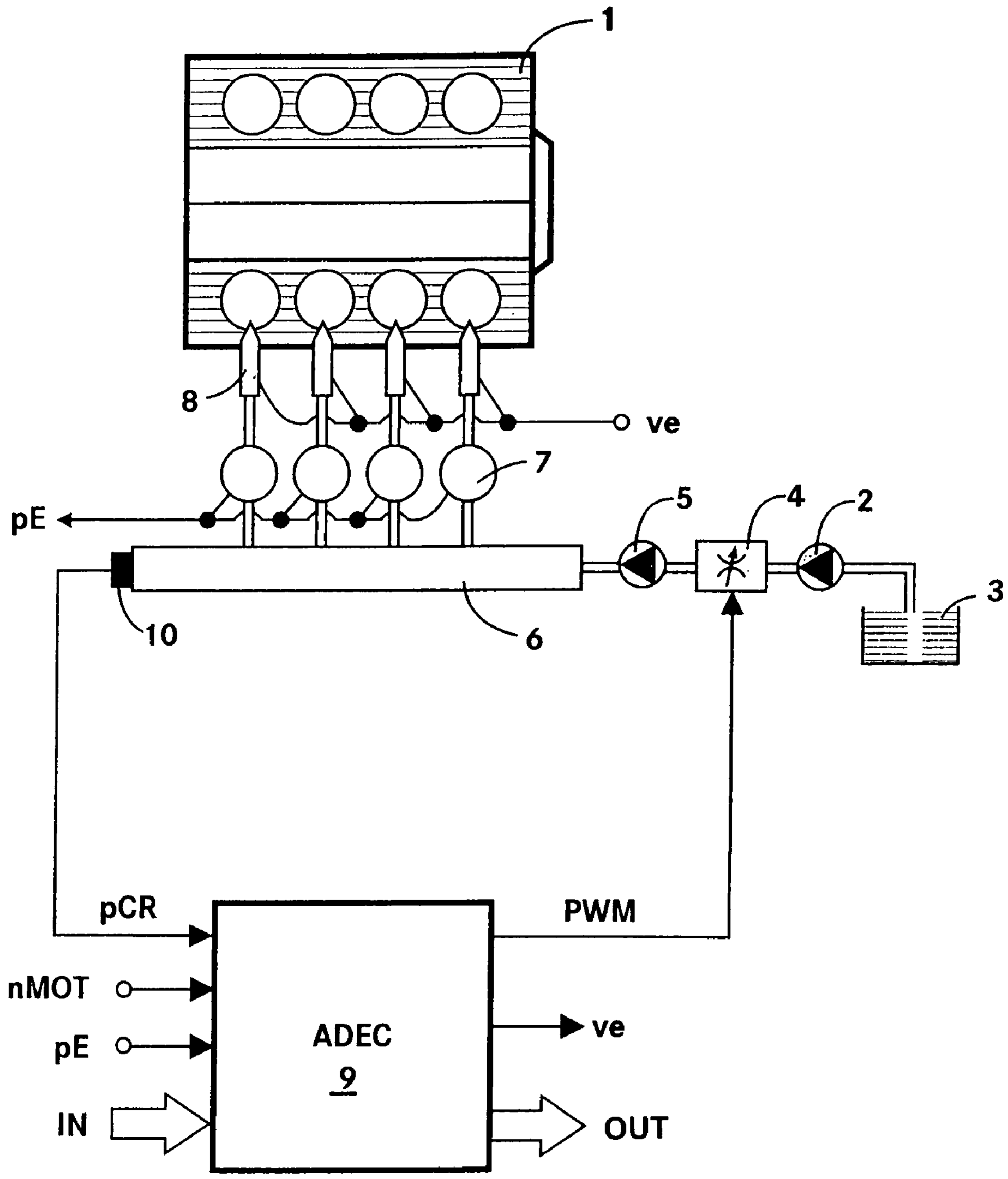
FIG. 1 shows a system diagram.

FIG. 1 shows a system diagram of an electronically controlled internal combustion engine 1, in which the fuel is injected by a common-rail injection system. This injection system comprises the following components: a low-pressure pump 2 for delivering fuel from a fuel tank 3, a suction throttle 4 for establishing a volume flow, a high-pressure pump 5 for pumping the fuel at increased pressure into a rail 6, individual accumulators 7 for temporary storage of the fuel, and injectors 8 for injecting the fuel into the combustion chambers of the internal combustion engine 1.

The common-rail system with individual accumulators 7 differs from a conventional common-rail system in that the fuel to be injected is taken from the individual accumulator 7. The feed line from the rail 6 to the individual accumulator 7 is designed in such a way in practice that feedback of interfering frequencies into the rail 6 is damped. During the injection interruption, just enough fuel continues to flow from the rail 6 that the individual accumulator 7 is filled again at the beginning of the injection. The hydraulic resistance of the individual accumulator 7 and that of the feed line are coordinated with each other, i.e., the connecting line from the rail 6 to the individual accumulator 7 has a hydraulic resistance that is as high as possible. In a conventional common-rail system without individual accumulators, the hydraulic resistance between the rail 6 and the injector 8 should be as low as possible in order to realize unhindered injection.

The internal combustion engine 1 is automatically controlled by an electronic control unit (ADEC) 9. The electronic control unit 9 contains the usual components of a microcomputer system, for example, a microprocessor, interface adapters, buffers, and memory components (EEPROM, RAM). The relevant operating characteristics for the operation of the internal combustion engine 1 are applied in the memory components in input-output maps/characteristic curves. The electronic control unit 9 uses these to compute the output variables from the input variables. FIG. 1 shows the following input variables as examples: a rail pressure pCR, which is measured by means of a rail pressure sensor 10, a speed signal nMOT of the internal combustion engine 1, pressure signals pE of the individual accumulators 7, and an input variable IN. Examples of input variables IN are the charge air pressure of a turbocharger and the temperatures of the coolant/lubricant and the fuel.

As output variables of the electronic control unit 9, FIG. 1 shows a signal PWM for controlling the suction throttle 4, a power-determining signal ve, for example, an injection quantity to represent a set torque in a torque-based closed-loop control system, and an output variable OUT. The output variable OUT is representative of additional control signals for automatically controlling the internal combustion engine 1.

Figure 2:
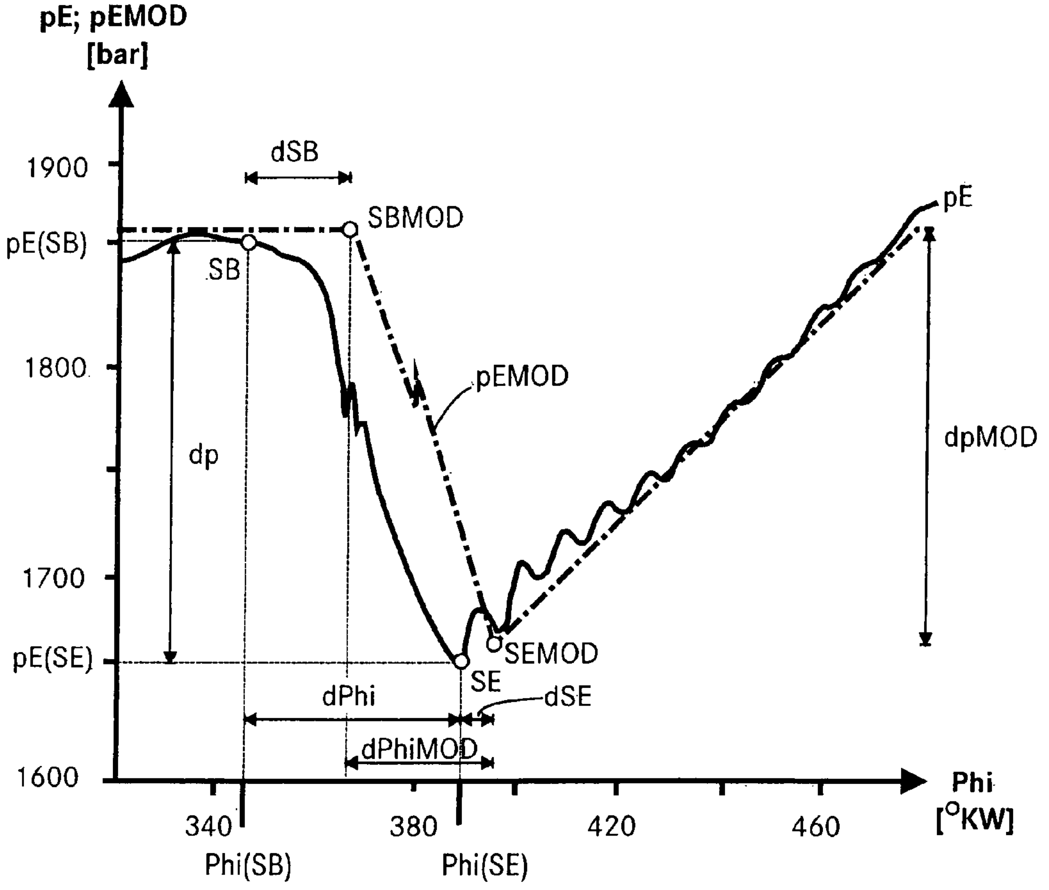
FIG. 2 shows a time diagram of an injection.

FIG. 2 shows a diagram of a measured pressure distribution pE in an individual accumulator and of a modeled pressure distribution pEMOD. The measured pressure distribution pE is plotted as a solid line. The modeled pressure distribution pEMOD is plotted as a dot-dash line. In this diagram, the modeled pressure distribution pEMOD is drawn after the first computational pass, i.e., the modeled pressure distribution pEMOD still differs significantly from the measured pressure distribution pE.

The crankshaft angle Phi is plotted on the x-axis. The measured individual accumulator pressure pE and the modeled individual accumulator pressure pEMOD are plotted on the y-axis. The pressure distribution in the individual accumulator is measured over a measurement interval and stored. In this regard, the measurement interval can correspond to one operating cycle, i.e., a 720° crankshaft angle. The measurement interval shown in FIG. 2 comprises, for example, the range from 320 to 460° crankshaft angle.

The method proceeds as described below. The steps that are described correspond to a program sequence of an executable program.

In a first step, the injection characteristics are determined from the measured pressure distribution pE. The characteristics are the injection start SB, the injection end SE, the pressure difference dp and an injection angle range dphi. The pressure difference is computed from the difference represented by the injection start pressure level pE(SB) minus the injection end pressure level pE(SE). The injection angle range dPhi is computed from the difference represented by the angle at the end of injection Phi(SE) minus the angle at the start of injection Phi(SB). The injection start SB can also be determined from the injection end SE by a mathematical function. A method of this type is disclosed in DE 103 44 181 A1.

In a second step, the modeled pressure distribution pEMOD is reproduced according to the measured pressure distribution pE by means of the hydraulic model on the basis of set values for the injection output by the electronic control unit. The quantities that characterize the modeled pressure distribution are preferably the modeled injection start SBMOD, the modeled injection end SEMOD, the modeled pressure difference dpMOD, and the modeled angle range dPhiMOD.

In a third step, a difference of the characteristics of the measured pressure distribution pE and the modeled pressure distribution pEMOD is then formed. The reference symbols dSB, dSE, ddp, and ddphi represent the respective differences. In this regard, ddp is computed as the modeled pressure difference dpMOD minus the pressure difference dp. ddPHi is similarly computed as dSE minus dSB.

In a fourth step, the model parameters of the hydraulic model are then adjusted until the deviation is smaller than a limiting value GW, for example, GW<0.5° crankshaft angle. If this is the case, then the quantity of fuel computed from the hydraulic model is equal to the actual quantity of fuel. The fuel quantity computed from the model is then set as the controlling value for the further control of the internal combustion engine.

In FIG. 2, the pressure distribution pE and the modeled pressure distribution pEMOD are plotted over the crankshaft angle Phi. Alternatively, the pressure distribution can be plotted as a function of time. In this case, the references in the text are to be understood as references to time.

Figure 3:
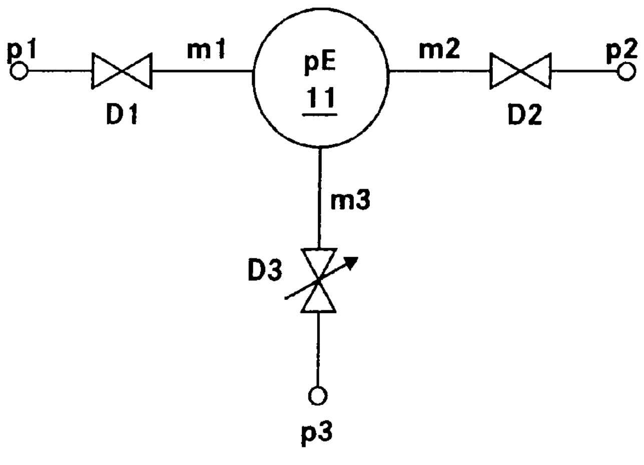
FIG. 3 shows the model.

FIG. 3 shows the hydraulic model. The input variables are a first pressure p1, which corresponds to the pressure level produced by the high-pressure pump 5, and a first mass flow m1. The output variables are a second pressure p2, a second mass flow m2, a third pressure p3, and a third mass flow m3. The second pressure p2 corresponds to the pressure level in the low-pressure zone. The second mass flow m2 represents the leakage of the system. The third pressure p3 corresponds to the cylinder pressure and is approximately constant. The third mass flow m3 stands for the injected quantity of fuel. The reference symbol D1 represents a first, D2 a second, and D3 a third restrictor. The third restrictor corresponds to the injection nozzle. The reference symbol 11 designates the individual accumulator volume. The hydraulic characteristics of the first restrictor D1 are known from bench measurements and remain constant during operation. The hydraulic characteristics of the second restrictor D2 are variable but can be determined from the pressure increase phase in the individual accumulator pressure and its deviation. The hydraulic characteristics of the third restrictor D3, i.e., the injection nozzle, vary with the needle stroke. Their change with respect to time can be measured on a component test stand, for example, by the method described in DE 198 50 221 C1.

The preceding description reveals the following advantages of the method of the invention:

the quantity of fuel can be exactly determined by the modeling of the individual accumulator distribution;

the hydraulic state of the injector is reproduced; and the hydraulic model represents a redundant system and therefore can guarantee continued operation in case of error.

Although the present invention has been described in relation to particular embodiments thereof, many other variations and modifications and other uses will become apparent to those skilled in the art. It is preferred, therefore, that the present invention be limited but by the specific disclosure herein, but only by the appended claims.

The invention claimed is:

1. A method for controlling an internal combustion engine with a common-rail system and individual accumulators, comprising the steps of: computing an actual fuel quantity by measuring a pressure distribution (pE) of an individual accumulator over a measurement interval, reproducing a modeled pressure distribution (pEMOD) according to the measured pressure distribution (pE) by means of a hydraulic model, and computing the actual fuel quantity from the hydraulic model; and setting the computed actual fuel quantity as a controlling value for controlling an injection.

2. The method in accordance with claim 1, further including computing deviations from the measured pressure distribution of the individual accumulator (pE)to the modeled pressure distribution (pEMOD), and adjusting the model parameters until the deviations are smaller than a limiting value (GW).

3. The method in accordance with claim 2, wherein the deviations are determined for quantities that characterize the injection.

4. The method in accordance with claim 3, wherein the quantities are an injection start (SB), an injection end (SE), a pressure difference (dp) from the pressure level at the start of the injection (pSB) to the pressure level at the end of the injection (pSE), and an injection angle range (dPhi).

5. The method in accordance with claim 3, wherein the quantities are an injection start (SB), an injection end (SE), a pressure difference (dp) from the pressure level at the start of the injection (pSB) to the pressure level at the end of the injection (pSE), and an injection time (dt).

* * * * *